(12) United States Patent
Horwood

(10) Patent No.: US 6,314,909 B1
(45) Date of Patent: Nov. 13, 2001

(54) POULTRY FEEDING SYSTEM

(75) Inventor: Francis Hedley Horwood, Auburn (AU)

(73) Assignee: F&M Horwood Nominees Pty Limited, Auburn (AU)

(*) Notice: Subject to any disclaimer, the term of this patent is extended or adjusted under 35 U.S.C. 154(b) by 0 days.

(21) Appl. No.: 09/445,784

(22) PCT Filed: Jun. 11, 1998

(86) PCT No.: PCT/AU98/00443

§ 371 Date: Mar. 6, 2000

§ 102(e) Date: Mar. 6, 2000

(87) PCT Pub. No.: WO98/56244

PCT Pub. Date: Dec. 17, 1998

(30) Foreign Application Priority Data

Jun. 11, 1997 (AU) .................................................. PO 7295
Sep. 30, 1997 (AU) .................................................. PO 9563

(51) Int. Cl.⁷ .................................................. A01K 29/00
(52) U.S. Cl. .................................................. 119/51.02
(58) Field of Search .............................. 119/51.01, 51.02, 119/840, 841, 842

(56) References Cited

U.S. PATENT DOCUMENTS

| | | | |
|---|---|---|---|
| 4,517,923 | 5/1985 | Palmer | 119/51 |
| 4,624,215 | * 11/1986 | Goldstein | 119/51 |
| 4,712,511 | 12/1987 | Zamzow et al. | 119/51 |
| 4,878,455 | 11/1989 | van der Veer | 119/57.5 |
| 4,920,923 | 5/1990 | Hosoya | 119/51.02 |
| 5,275,131 | 1/1994 | Brake et al. | 119/63 |
| 5,438,960 | * 8/1995 | Roosenboom | 119/713 |

* cited by examiner

*Primary Examiner*—Thomas Price

(57) ABSTRACT

A poultry feeding system for a shed housing a flock of birds includes a female feeding line, a male feeding line, and a feed supply system which includes a weigh bin for supplying feed to the female feed line, and a weigh bin for supplying feed to the male feed line. An array of weighing cells for automatically weighing and identifying at least some of the individual birds of the flock, is arranged about the shed and data provided by the weighing cells is processed by first computer device to average the overall weight of the flock in the shed. Data from the first computer device is processed by second computer device to calculate the ration of feed for the shed for a predetermined time interval to maintain optimum productive weight of the birds. A control device activates the feeding system at a predetermined time to supply the determined ration of feed.

5 Claims, 2 Drawing Sheets

POULTRY FEEDING SYSTEM

FIELD OF INVENTION

This invention relates to the feeding of poultry and more particularly but not exclusively to the feeding breeder chickens. The breeder chicken is the parent rearing stock which produces fertile eggs from which chickens are hatched.

BACKGROUND ART

Over the past 50 years there has been little change in the feeding technology used by the breeder industry which is based on a chain moving feed through a trough. In some areas feed is still distributed by an even older prior art by either broadcasting manually or by using manually filled hoppers throughout the shed. The latter two methods of feed distribution creates stress in the birds and has the potential for the birds to eat contaminated feed.

These prior art systems have the disadvantage that even though a male feed line is often provided, it is difficult to consistently exclude males from the female rations. This results in overweight males who are then incapable of producing the maximum number of fertile eggs per bird.

It is essential that a defined ideal bird weight as determined by the primary supplier is achieved for both sexes at a particular age if the maximum fertile egg production and feed utilization is to be realised.

The current feeding arrangements of the prior arts are based on the technology previously described and they are based upon the weekly handling of a sample of birds for weighing purposes. The results of these weighs form the basis for calculating the next week's feed rations.

To determine an accurate average weight for the flock, a hopefully representative sample of both male and female birds are manually selected from various parts of the shed and weighed. Based on these results the feed ration to be distributed for both sexes is calculated for the coming week. This manual handling places enormous stress on the birds which then leads to a drop of fertile egg production.

If the weighing shows an unacceptable uniformity of weight in the flock, the birds are sorted into smaller more evenly matched groups so that a remedial feeding program can be undertaken. This manual sorting of the flock is both costly, time consuming and stressful, not least of which is due to interference with the social order. There is also stress caused by handling.

With recent genetic improvements, a breeder hen can lay 180 eggs during its productive lifetime, however with the use of current systems, the hens more usually produce between 110 and 130 eggs.

It is an object of the invention to enable birds to achieve their most productive output by automatically calculating and updating the correct weight and volume of feed to be distributed to the birds using a statistically correct bird weight for age information base.

SUMMARY OF INVENTION

According to one aspect of the invention there is provided a poultry feeding system for a shed housing a flock of birds in which the birds roam freely, comprising:

(i) at least one female feeding line,
(ii) a male feeding line,
(iii) a feeding system including a weigh bin for supplying feed to the at least one female feeding line, and a weigh bin for supplying feed to the male feeding line,
(iv) an array of weighing cells for automatically weighing and identifying target birds formed of a representative sample of all the birds of the flock, said weighing cells being located at selected spaced apart sites in the shed so as to weigh the said target birds whenever they roam onto the weighing cells,
(v) first means for receiving data provided by the weighing cells adapted to average the overall weight of the flock in the shed,
(vi) second means adapted to receive data from the first means and to calculate a ration of feed for the shed for a predetermined time interval to maintain optimum productive weight of the birds, and
(vii) control means for activating the feeding system at a predetermined time to supply the calculated ration of feed.

Preferably, the data received by the first means consists of the identity, sex and weight of the target birds which use the weighing cells. The identity and sex of the target birds which are weighed are preferably identified by a responder fitted to a leg of each of the said target birds. The second means compares the data received from the first means to a weight for age chart for both males and females and using data on how many birds are within the shed, calculates the ration of feed for the shed for the next 24 hours.

The first and second means could be consolidated into a single means.

According to another aspect of the invention, there is provided a method of feeding a flock of poultry birds in a shed in which the birds roam freely having at least one female feeding line, a male feeding line, a feeding system for supplying feed to the female feeding line and to the male feeding line, said method comprising:

(i) providing an array of weighing cells which automatically weigh and identify target birds formed of a representative sample of all the birds of the flock, said weighing cells being located at selected spaced apart sites in the shed so as to weigh the said target birds whenever they roam onto the weighing cells,
(ii) obtaining from the array of weighing cells data representative of the identity, sex and weight of the target birds and utilizing that data to estimate the average overall weight of the flock, and
(iii) comparing the overall average weight of the flock with weight for age charts for both male and female birds and using data on the number within the shed to calculate a ration of feed for the shed for the next feeding cycle.

Figure 1:
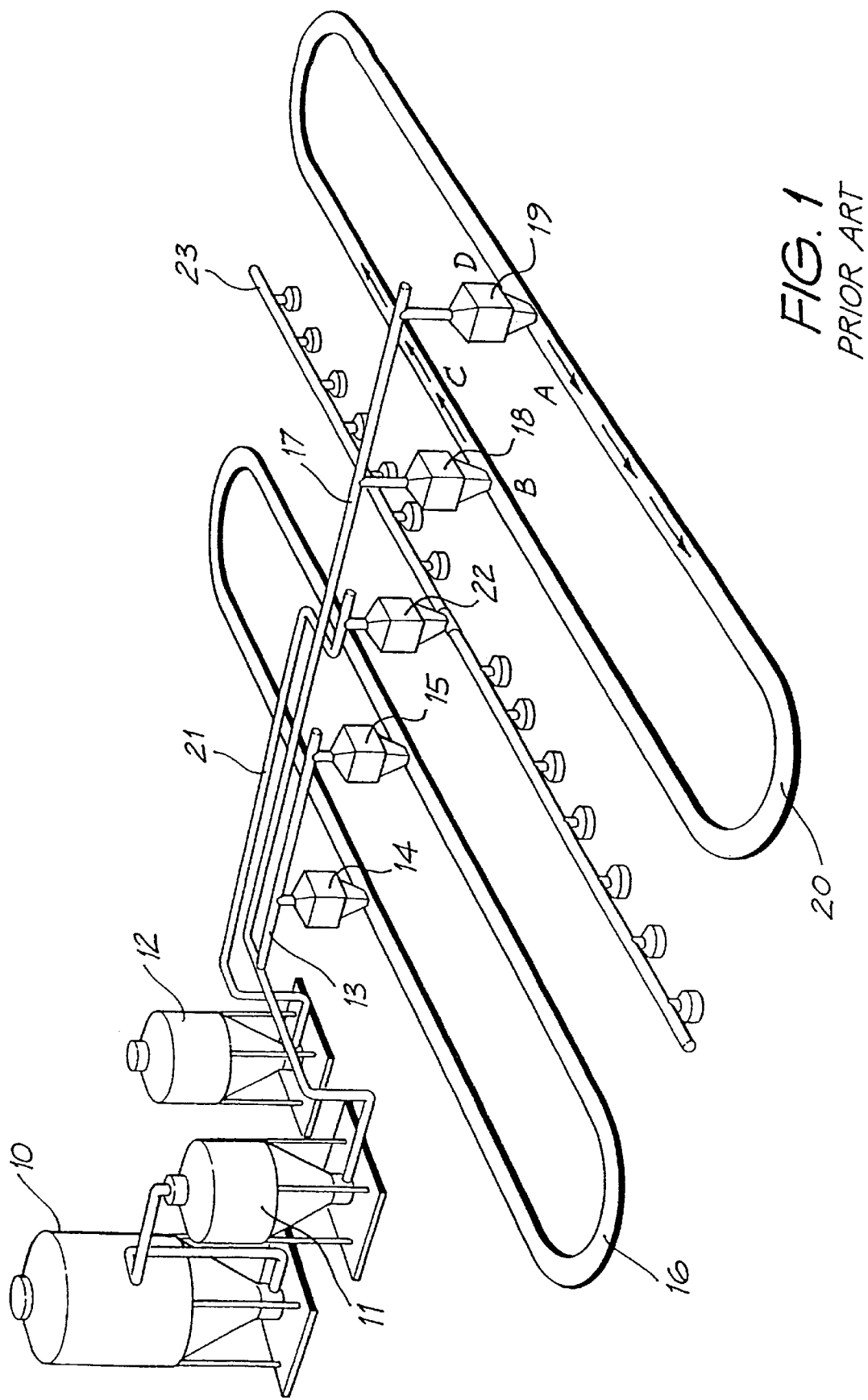
FIG. 1 is a schematic diagram of a poultry feeding system of the more recent prior art.

The prior art feeding system shown in FIG. 1 includes a bulk storage feed silo 10, a weigh bin 11 for feed for female birds and a weigh bin 12 for feed for male birds. A feed supply line 13 delivers feed from the female weigh bin 11 to feed bins 14 and 15 at the first female trough feeder 16 and feed supply line 17 delivers feed to feed bins 18 and 19 at the second female trough feeder 20. Feed supply line 21 delivers feed from the male weigh bin 12 to feed bin 22 at the male pan feeder 23.

Feed from the bins 14, 15 and 18, 19 is dispersed clockwise on the first and second female trough feeders 16 and 20 respectively as shown by arrows on feeder line 20. Hens situated at locations B and D receive less than an equal value of feed compared with the hens at locations A and C. Also, the quality of feed deteriorates as it travels around the trough feeders 16 and 20 due to breakage, separation and selective feeding by the first birds to the trough.

Other disadvantages of the prior art trough feeders are high maintenance and sanitation costs caused by the trough feeders having to be dismantled and removed twice from the shed—firstly after rearing is completed and secondly after the end of production at 78 weeks. Furthermore, feed space restricts bird numbers in the shed.

Manual weighing of the birds leads to an inaccurate calculation of feed rations due to the technique used and human error. As weighing is carried out weekly, rectification requirements often take some time to become effective. The replacement of out of condition males requires costly separate rearing and causes social disturbance and extreme stress when they are introduced to the established flock.

Uneven bird weights result in loss of fertile egg numbers. In the prior art, there is great difficulty maintaining a uniform ideal weight as manual sampling is inefficient and does not provide a true weight for the overall flock due to uneven distribution of bird weights in the shed. Uneven flocks require a manual sorting by weight and placing the out of weight birds in selected groups where special feeding regimes are undertaken so that a more even overall flock weight is attained. (This procedure is only carried out in the rearing stage.)

As handling causes serious stress on the birds, weighing of the birds cannot be undertaken more than once a week. Under or overfeeding can arise with this weekly weighing regime due to inaccuracy of the sampling methods. This leads as a consequence to an inaccurate calculation of feed rations and a week long delay to verify the error and make any corrections to the distributed ration. The end result is a loss of fertile egg production on three counts namely:

(i) Through stress to the birds, (ii) birds not being the correct weight through inaccurate information gathered from the weighings used to calculate the feed ration and/or (iii) human feed calculation errors.

Figure 2:
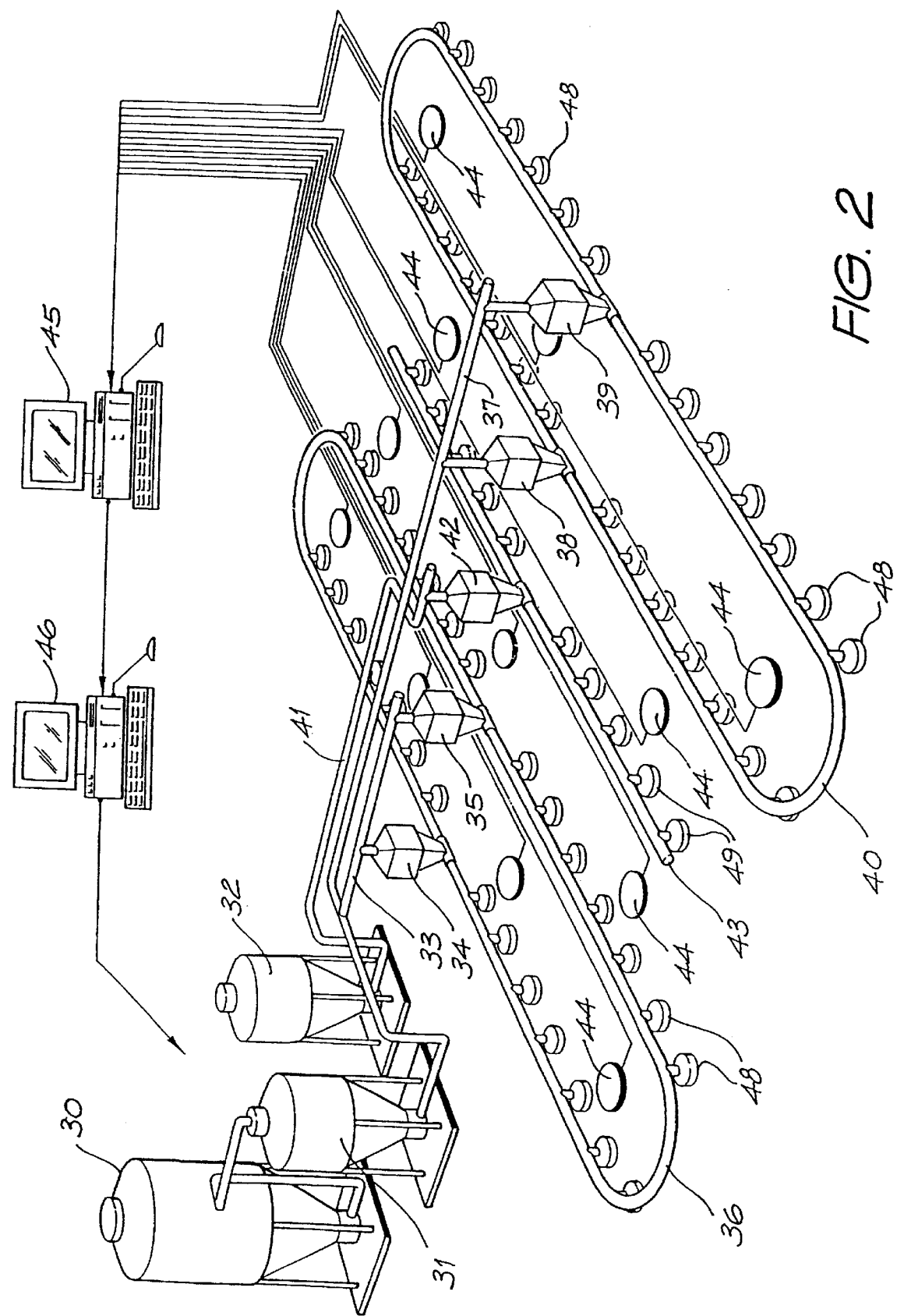
FIG. 2 is a schematic diagram of a poultry feeding system according to one embodiment of the invention.

The feeding system of one embodiment of the invention shown in FIG. 2 includes a bulk storage feed silo 30, a weigh bin 31 for feed for female birds and a weigh bin 32 for feed for male birds. A supply line 33 delivers feed from the female weigh bin 31 to feed bins 34 and 35 at the first hen feeder line 36 and feed supply line 37 delivers feed to feed bins 38 and 39 at the second hen feeder line 40. Feed supply 41 delivers feed from the male weigh bin 32 to feed bin 42 at the male feeder line 43. Preferably, the feeder line 36, 40 and 43 are auger and pan feeder lines.

Automatic weighing cells 44 automatically weigh and identify individual male and female birds. A sample of birds is fitted with a responder so that as a bird moves across the weighing scales 44 strategically located throughout the shed, its accurate weight and identity is recorded. This data is relayed constantly to the bird weight computer 45 to provide a true weight for age and evaluation of body condition for each bird without manually handling the birds.

The bird weight computer 45 sends this data to the main control computer 46.

The computer 46 calculates the exact feed requirement for the total number of birds in each shed. The female weigh bin 31 and male weigh bin 32 on each shed is then programmed by the computer to dispense the exact feed requirement for the male feedline 41 and female feedline 33 for that particular shed. The information generated by the computer can be verified and adjusted manually if necessary by an operator to acknowledge any outside influences which could affect that calculation. A by-product of the verification is that it ensures that the operator checks the physical functioning of the equipment on a daily basis.

At a predetermined time, the main control computer 46 switches the lights on throughout the shed to wake the chickens. The computer 46 will then start the feeding system within one hour. This allows for the optimum time for the hens to lay in the nest which is approximately two hours from waking. This is essential for the production of clean hatchable eggs and the reduction of disease.

The feed auger and pan systems 36, 40 and 43 incorporate an order delivery system which simultaneously, accurately and evenly distributes to each feed pan in both the male line 43 and female lines 36 and 40 on start up and provides uninterrupted availability of the allotted feed throughout the feeding cycle and provides a feeding space for each bird. The pans 48 on the female pan feeder lines 36 and 40 may be the male excluder poultry feeder disclosed in our Australian patent specification 42,107/96, the content of which is incorporated herein by way of cross reference.

The feeding pans 49 of the male pan feeder line 43 may be the restricted flow poultry feeders of our Australian patent specification 42,128/96, The content of which is incorporated herein by cross reference.

Rotational swinging of the feeding pans 48 and 49 with respect of the auger pipe of the pan feeder lines 36, 40 and 43 may be restricted by in incorporating the means for preventing rotational swinging of the pans with respect of an auger pipe disclosed in the specification of our Australian patent application 42, 127/96, the content of which is incorporated herein by cross reference.

The feeding pans 48 and 49 may be the quick release and firmly locking pans disclosed in the specification of our Australian patent application 42, 108/96, the content of which is incorporated herein by cross reference. The pans 48 and 49 may also incorporate the feed shut off valve disclosed in the specification of our Australian patent application 42, 109/96, the content of which is incorporated herein by cross reference.

The invention's automated weighing systems and it's sophisticated programs give an output which gives a summary of the current weight status of the flock. The summary provides separate statistics for males and females and is capable of showing the number of weighings recorded, the range of weights, the median weight and the standard deviation of the weights. The invention will also display this information graphically and accumulates a history for the life of the flock. This allows at the least a daily evaluation of any possible problems in bird health.

The improved feeding and weighing fits into the overall management program and provides total synchronisation of bird waking, feeding and laying cycles.

The weighing system allows increased accuracy and efficiency eliminating the need for manual labour to weigh, sort and segregate birds by weight so that remedial action can be undertaken to bring flocks back to standard.

The combination of correct daily bird weight and the pan feeding system disclosed in Australian patent specifications 42,107/96, 42,108/96, 42,109/96, 42,127/96 and patent specification 42,128/96 produces a reduction in feed costs from 15 to 20% due to the ability of the total system to simultaneously, accurately, evenly distribute and maintain a consistently high quality feed to all pans throughout the shed on a daily basis.

These two components of correct bird weight and feed distribution form a necessary part of the overall shed management system.

The use of the auger and pan feeding system leads to better utilisation of shed space due to more available feeding space at peak demand time.

There is also easier access and there are no barriers which allow increased bird movement as pans are suspended from the delivery auger tube located above the birds heads. The pan system provides 30% more bird feeding space than the trough feeding system of the prior art. Furthermore, there is minimum sanitation and maintenance requirements as the equipment does not have to be removed from the shed as it is suspended from the ceiling by a winch system.

The invention and feeding system leads to a dramatic reduction in stress due to the elimination of manual weighing, sorting and relocation of birds by weight, more efficient feeding, less disturbance by staff, the elimination of male replacement due to better weight control monitoring and increased productivity due to less handling All of these factors contribute to the realisation of the birds genetic capabilities.

There is also increased efficiency for the producer as no time is required to correct uneven bird weights and staff will have more time to devote to animal husbandry. Staff turnover will also be reduced due to better and safer working conditions.

Various modifications may be made in details of design, construction and implementation of the system without departing from the scope and ambit of the invention.

What is claimed is:

1. An automated poultry feeding system for a shed housing a flock of birds in which the birds roam freely, comprising:
   (i) at least one female feeding line,
   (ii) a male feeding line,
   (iii) a feeding system including a weigh bin for supplying feed to the at least one female feeding line, and a weigh bin for supplying feed to the male feeding line,
   (iv) an array of weighing cells for automatically weighing and identifying target birds formed of a representative sample of all the birds of the flock, said weighing cells being located at selected spaced apart sites in the shed so as to weigh the said target birds whenever they roam onto the weighing cells,
   (v) first programmable controller means for receiving data provided by the weighing cells adapted to average the overall weight of the flock in the shed,
   (vi) second programmable controller means adapted to receive data from the first programmable controller means and to calculate a ration of feed for the shed for a predetermined time interval to maintain optimum productive weight of the birds, and
   (vii) control means adapted to receive data from the second programmable controller means and to automatically activate the feeding system at a predetermined time to supply the calculated ration of feed.

2. The poultry feeding system according to claim 1 wherein the data received by the first programmable controller means consists of the identity, sex and weight of the target birds which use the weighing cells.

3. The poultry feeding system according to claim 2 wherein the identity and sex of the target birds which are weighed are identified by a responder fitted to a leg of each of said target birds.

4. The poultry feeding system according to claim 2 wherein the second programmable controller means compares the data received from the first programmable controller means to a weight for age chart for both males and females and using data on how many birds are within the shed, calculates the ration of feed for the shed for the next 24 hours.

5. A method of feeding a flock of poultry birds in a shed in which the birds roam freely having at least one female feeding line, a male feeding line, a feeding system for supplying feed to the female feeding line and to the male feeding line, said method comprising:
   (i) providing an array of weighing cells which automatically weigh and identify target birds formed of a representative sample of all the birds of the flock, said weighing cells being located at selected spaced apart sites in the shed so as to weigh the said target birds whenever they roam onto the weighing cells,
   (ii) obtaining from the array of weighing cells data representative of the identity, sex and weight of the target birds and utilizing that data to estimate the average overall weight of the flock, and
   (iii) comparing the overall average weight of the flock with weight for age charts for both male and female birds and using data on the number within the shed to calculate a ration of feed for the shed for the next feeding cycle.

* * * * *